United States Patent
Lee et al.

(10) Patent No.: US 8,447,338 B2
(45) Date of Patent: May 21, 2013

(54) DATA UNIT RECEPTION MANAGEMENT METHOD AND RELATED SYSTEM AND DEVICE

(75) Inventors: Young Dae Lee, Seoul (KR); Sung Duck Chun, Seoul (KR); Seung June Yi, Seoul (KR); Sung Jun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 12/786,327

(22) Filed: May 24, 2010

(65) Prior Publication Data

US 2010/0304774 A1 Dec. 2, 2010

Related U.S. Application Data

(60) Provisional application No. 61/182,083, filed on May 28, 2009.

(51) Int. Cl.
*H04B 7/00* (2006.01)
*H04B 15/00* (2006.01)

(52) U.S. Cl.
USPC ............ 455/509; 455/450; 455/512; 455/513

(58) Field of Classification Search
CPC ........................................................ H04L 29/08
USPC ............... 455/450, 451, 452.1, 453, 512, 513
See application file for complete search history.

(56) References Cited

U.S. PATENT DOCUMENTS

| | | | | |
|---|---|---|---|---|
| 6,614,810 B1 * | 9/2003 | Lee et al. | | 370/471 |
| 7,394,778 B2 * | 7/2008 | Kim | | 370/312 |
| 7,684,358 B2 * | 3/2010 | Kim et al. | | 370/312 |
| 7,773,506 B2 * | 8/2010 | Agashe et al. | | 370/230 |
| 7,864,722 B2 * | 1/2011 | Yi et al. | | 370/312 |
| 8,081,662 B2 * | 12/2011 | Chun et al. | | 370/474 |
| 8,085,709 B2 * | 12/2011 | Franceschini et al. | | 370/328 |
| 8,345,611 B2 * | 1/2013 | Park et al. | | 370/329 |
| 2003/0012217 A1 * | 1/2003 | Andersson et al. | | 370/437 |
| 2003/0231643 A1 * | 12/2003 | Gilchrist et al. | | 370/401 |
| 2004/0156330 A1 * | 8/2004 | Yi et al. | | 370/328 |
| 2005/0078653 A1 * | 4/2005 | Agashe et al. | | 370/349 |
| 2005/0237960 A1 * | 10/2005 | Kim | | 370/312 |
| 2006/0007886 A1 | 1/2006 | Lee et al. | | |
| 2008/0043623 A1 * | 2/2008 | Franceschini et al. | | 370/235 |
| 2010/0254480 A1 * | 10/2010 | Park et al. | | 375/295 |
| 2011/0019604 A1 * | 1/2011 | Chun et al. | | 370/312 |

FOREIGN PATENT DOCUMENTS

| | | |
|---|---|---|
| WO | 2006/109900 | 10/2006 |
| WO | 2007/052921 | 5/2007 |
| WO | 2008/151069 | 12/2008 |
| WO | 2009/033254 | 3/2009 |
| WO | 2009/038363 | 3/2009 |

* cited by examiner

*Primary Examiner* — Tilahun B Gesesse
(74) *Attorney, Agent, or Firm* — Lee, Hong, Degerman, Kang & Waimey

(57) ABSTRACT

A method of managing reception of data units transmitted from a radiocommunication network to a plurality of user equipments via a plurality of common upper level channels mapped to a same common lower level channel. The method comprises the following steps carried out by any user equipment of said plurality of user equipments: receiving a list of information relating respectively to each common upper level channel of said plurality of common upper level channels in a determined order, said information including no common upper level channel identifier; and setting a common upper level channel identifier for each common upper level channel of said plurality of common upper level channels according to the received list of information.

24 Claims, 7 Drawing Sheets

DATA UNIT RECEPTION MANAGEMENT METHOD AND RELATED SYSTEM AND DEVICE

CROSS-REFERENCE TO RELATED APPLICATIONS

This application claims the benefit of earlier filing date and right of priority to U.S. Provisional Application No. 61/182,083, filed on May 28, 2009.

BACKGROUND

1. Technical Field

The present invention relates to managing the reception of data units transmitted from a radiocommunication network to a plurality of user equipments via a plurality of common upper level channels mapped to a same common lower level channel.

2. Related Art

Many different types of radiocommunication networks exist. GSM, UMTS, LTE and LTE-advanced are non-limiting examples of such radiocommunication networks.

Figure 1:
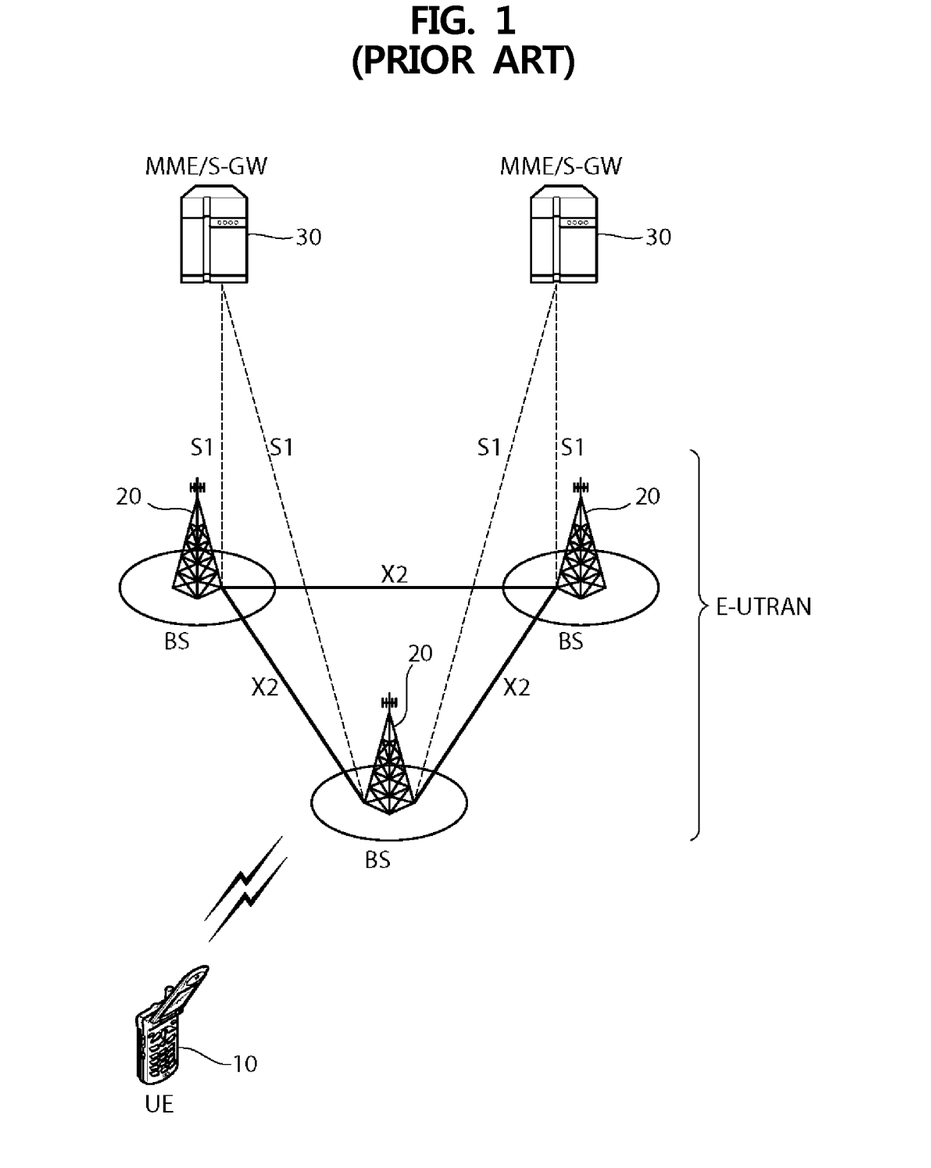
FIG. 1 is a block diagram showing a radiocommunication system.

FIG. 1 is a block diagram showing a radiocommunication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
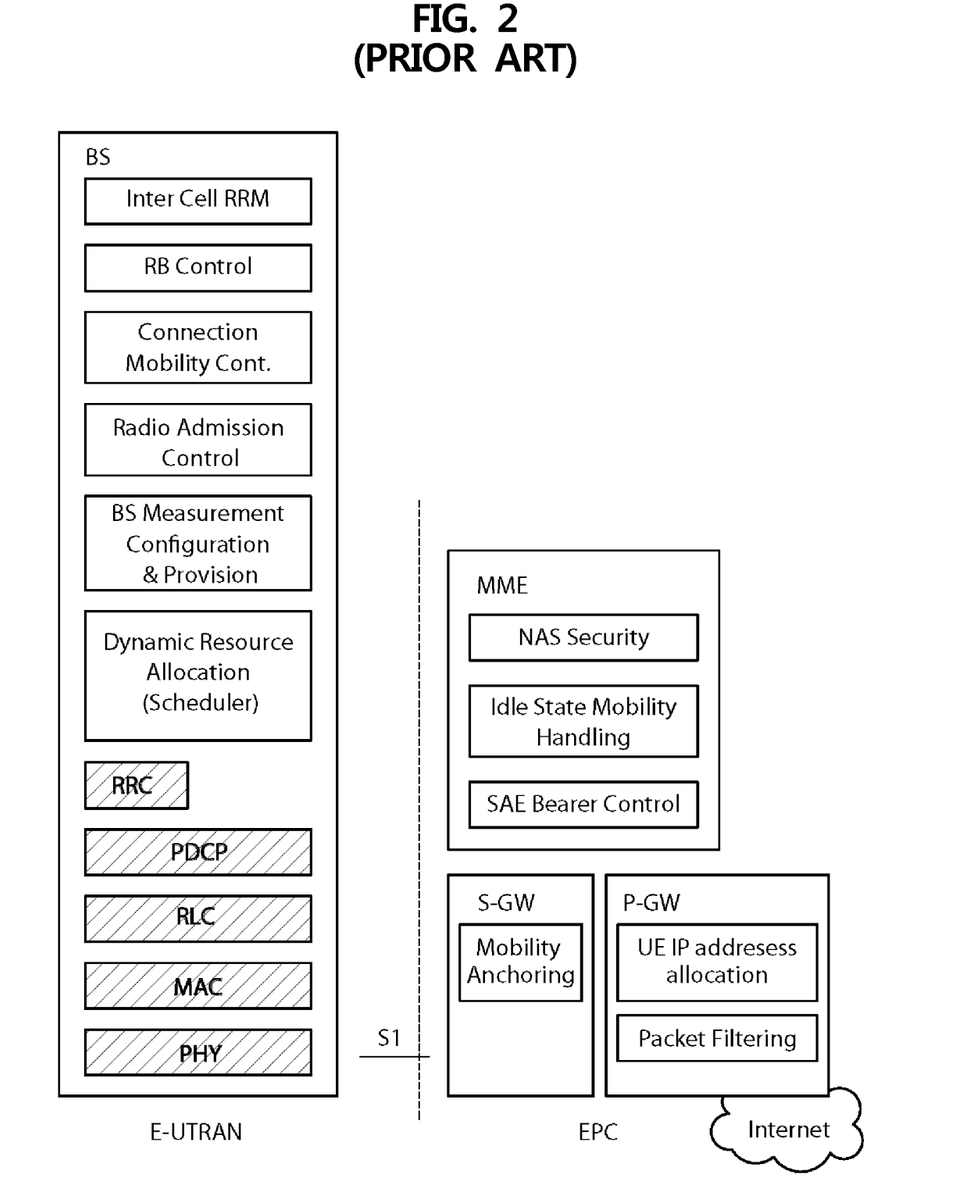
FIG. 2 is a block diagram showing functional split between the E-UTRAN and the EPC.

FIG. 2 is a block diagram showing functional split between the E-UTRAN and the EPC. Slashed boxes depict radio protocol layers and white boxes depict the functional entities of the control plane. A BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling. The MME hosts the following functions. (1) NAS (Non-Access Stratum) signaling, (2) NAS signaling security, (3) Idle mode UE Reachability, (4) Tracking Area list management, (5) Roaming and (6) Authentication. The S-GW hosts the following functions. (1) Mobility anchoring and (2) lawful interception. The PDN gateway (P-GW) hosts the following functions. (1) UE IP (internet protocol) allocation and (2) packet filtering.

Figure 3:
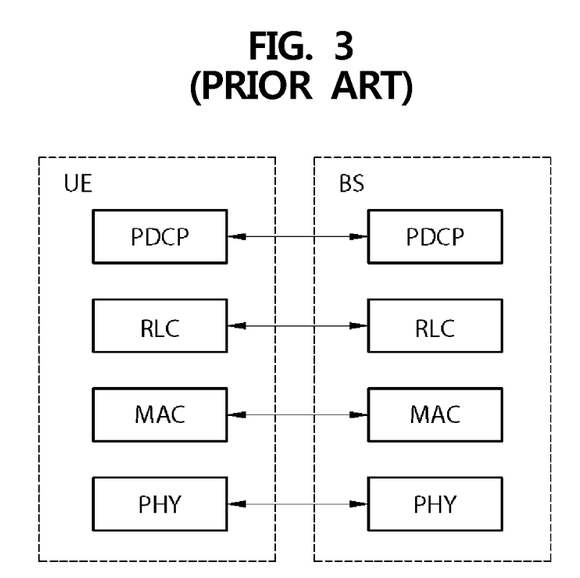
FIG. 3 is a block diagram showing radio protocol architecture for a user plane.
Figure 4:
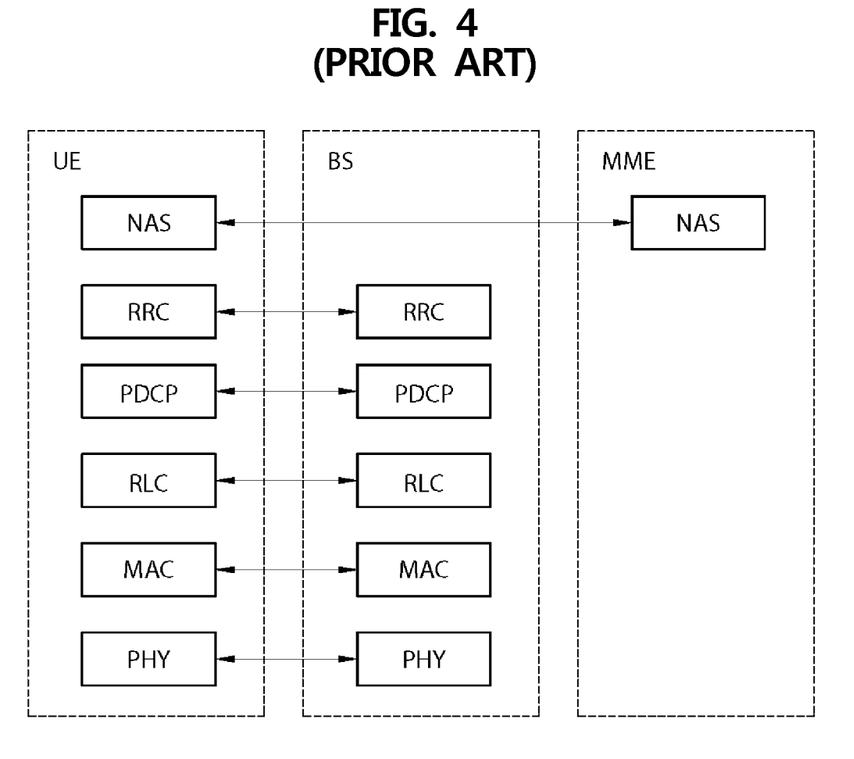
FIG. 4 is a block diagram showing radio protocol architecture for a control plane.

FIG. 3 is a block diagram showing radio protocol architecture for a user plane. FIG. 4 is a block diagram showing radio protocol architecture for a control plane. The data plane is a protocol stack for user data transmission and the control plane is a protocol stack for control signal transmission.

Referring to FIGS. 3 and 4, a physical (PHY) layer provides information transfer services to an upper layer by using a physical channel. The PHY layer is connected with a MAC (Medium Access Control) layer, i.e., an upper layer of the PHY layer, through transport channels. Data is transferred between the MAC layer and the PHY layer through the transport channels. The transport channels are classified by how and with what characteristics data are transferred over the radio interface. Between different physical layers, i.e., the physical layer of a transmitter and the physical layer of a receiver, data is transferred through the physical channel.

There are several physical control channels used in the physical layer. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NACK signals in response to uplink transmissions. A physical uplink control channel (PUCCH) carries uplink control information such as HARQ ACK/NACK in response to downlink transmission, scheduling request and channel quality indicator (CQI). A physical uplink shared channel (PUSCH) carries uplink shared channel (UL-SCH).

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels. Logical channels may be classified into two groups: control channels for the transfer of control plane information and traffic channels for the transfer of user plane information.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ) scheme.

The functions of a PDCP (Packet Data Convergence Protocol) layer for the user plane include transfer of user data, header compression/decompression and ciphering/deciphering. The functions of the PDCP layer for the control plane include transfer of control plane data, and ciphering and integrity protection.

The RRC (Radio Resource Control) layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

A NAS (Non-Access Stratum) layer belonging to the upper layer of the RRC layer serves to perform session management and mobility management.

Figure 5:
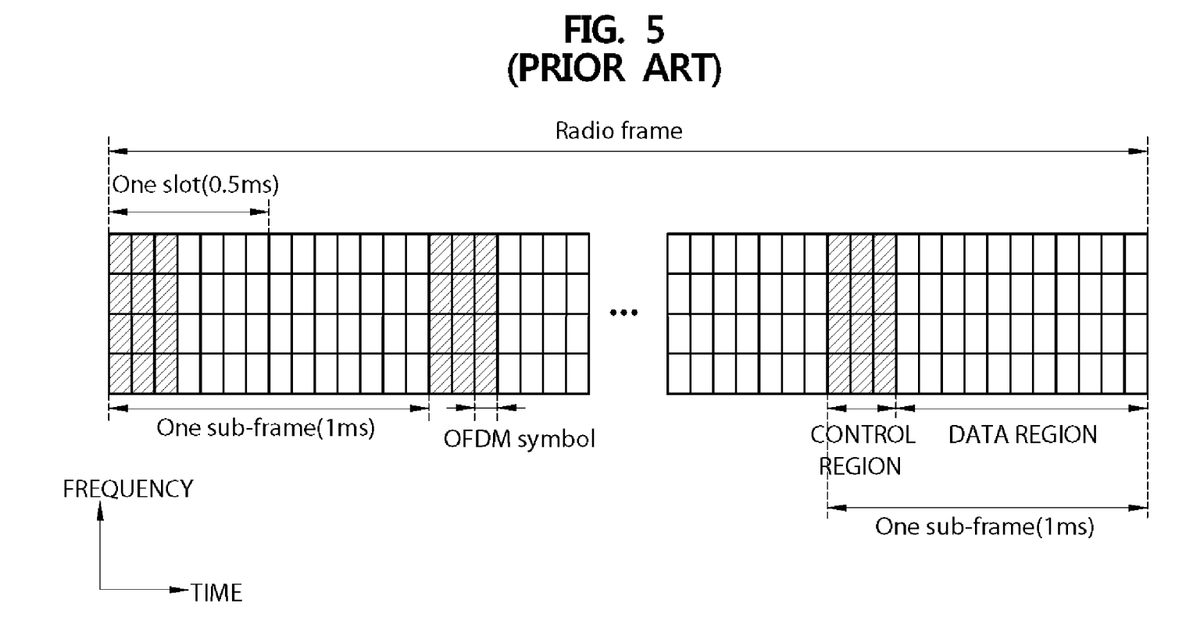
FIG. 5 shows an example of a radio frame structure.

FIG. 5 shows an example of a radio frame structure.

Referring to FIG. 5, a radio frame includes 10 subframes, and a subframe includes 2 slots. The time used to transmit a subframe is referred to as a transmission time interval (TTI). For example, the length of a subframe is 1 ms and the length of a slot can be 0.5 ms.

One slot includes a plurality of orthogonal frequency division multiplexing (OFDM) symbols in time domain. In a normal cyclic prefix (CP), a slot includes 7 OFDM symbols, and in an extended CP, a slot includes 7 OFDM symbols.

A OFDM symbol is for expression of a symbol duration in time domain because OFDMA is used for downlink transmission in 3GPP LTE, the OFDM symbol can be regarded as a SC-FDMA symbol or symbol duration.

A resource block is a unit of resource assignment in 3GPP LTE, and it includes a plurality of consecutive subcarriers, i.e. 12 subcarriers, in a slot.

As shown in 3GPP TS 36.211 V8.5.0 (2008-12) "Evolved Universal Terrestrial Radio Access (E-UTRA); Physical Channels and Modulation (Release 8)", a physical channel in LTE is divided into PDSCH (Physical Downlink Shared Channel), PUSCH (Physical Uplink Shared Channel) and PDSCH (Physical Downlink Control Channel)과 PUCCH (Physical Uplink Control Channel).

A subframe is divided into a control region and a data region in time domain. The control region comprises at most three OFDM symbols in a first slot of a subframe, and the number of OFDM symbols in the control region can be various. PDCCH is allocated to the control region, and PDSCH is allocated to the data region.

Figure 6:
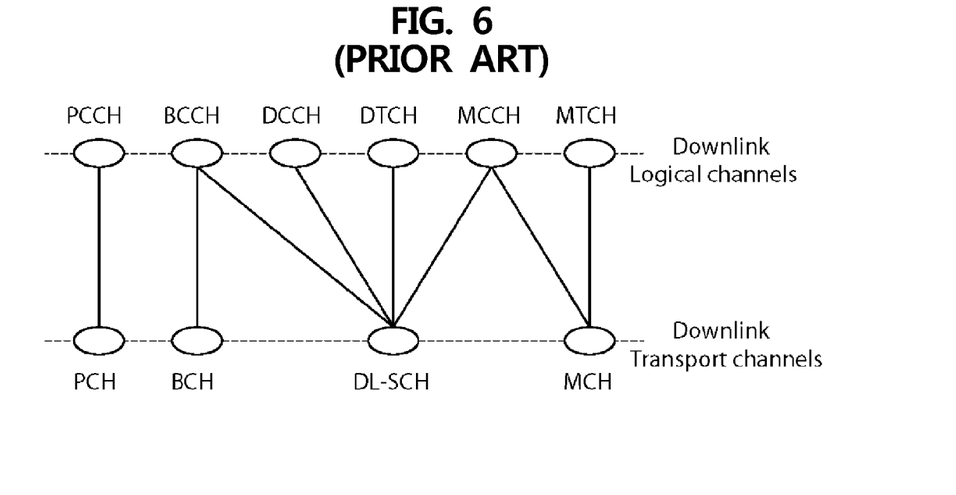
FIG. 6 shows mapping between downlink logical channels and downlink transport channels.

FIG. 6 shows mapping between downlink logical channels and downlink transport channels.

Referring to FIG. 6, a paging control channel (PCCH) can be mapped to a paging channel (PCH). A broadcast control channel (BCCH) can be mapped to a broadcast channel (BCD) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH).

Each logical channel type is defined by what type of information is transferred. A classification of logical channels is into two groups: control channels and traffic channels.

Control channels are used for transfer of control plane information. The BCCH is a downlink control channel for broadcasting system control information. The PCCH is a downlink channel that transfers paging information and is used when the network does not know the location cell of the UE. The CCCH is a channel for transmitting control information between UEs and a network and is used for UEs having no RRC connection with the network. The MCCH is a point-to-multipoint downlink channel used for transmitting multimedia broadcast multicast service (MBMS) control information from the network to the UE for one or several MTCHs and is only used by UEs that receive MBMS. The DCCH is a point-to-point bi-directional channel that transmits dedicated control information between a UE and the network and is used by UEs having an RRC connection.

Traffic channels are used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is only used by UEs that receive MBMS.

The transport channels are classified by how and with what characteristics data are transferred over the radio interface. The BCH is broadcasted in the entire coverage area of the cell and has fixed, pre-defined transport format. The DL-SCH is characterized by support for hybrid automatic repeat request (HARQ), support for dynamic link adaptation by varying the modulation, coding and transmit power, possibility to be broadcast in the entire cell, possibility to use beamforming, support for both dynamic and semi-static resource allocation, support for UE discontinuous reception (DRX) to enable UE power saving and support for MBMS transmission. The PCH is characterized by support for UE discontinuous reception (DRX) to enable UE power saving and requirement to be broadcast in the entire coverage area of the cell. The MCH is characterized by requirement to be broadcast in the entire coverage area of the cell, support for MBMS Single Frequency Network (MBSFN) combining of MBMS transmission on multiple cells.

Figure 7:
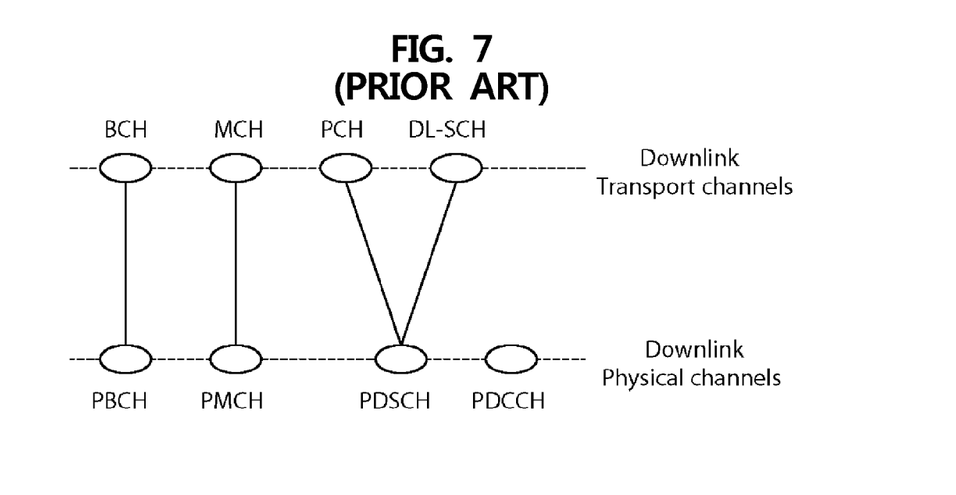
FIG. 7 shows mapping between downlink transport channels and downlink physical channels.

FIG. 7 shows mapping between downlink transport channels and downlink physical channels.

Referring to FIG. 7, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH.

A multimedia broadcast multicast service (MBMS) uses two logical channels, that is, an MCCH (i.e., a control channel) and an MTCH (i.e., a traffic channel). User data (e.g., actual voice or video) is transmitted on the MTCH. Configuration information for receiving the MTCH is transmitted on the MCCH. The MTCH and the MCCH are point-to-multipoint downlink channels for a plurality of UEs and can be regarded as common channels. In the MBMS, an amount of allocated radio resources does not coincide with the number of UEs receiving services. Instead, only radio resources for the common channels are allocated and the common channels are simultaneously received by the plurality of UEs, thereby improving efficiency of the radio resources.

From the above description, it can be easily understood that transmission of data units from a radiocommunication network to a plurality of UEs via a plurality of common upper level channels mapped to a same common lower level channel is possible. This is the case, for example, when a plurality of common logical channels are mapped to a same common transport channel, although other types of channels might be considered instead. For instance, a plurality of MCCH and/or MTCH channels may be mapped onto one DL-SCH channel or one MCH channel as discussed earlier.

In order for a UE to be able to identify the common logical channel on which it receives data units from the radiocommunication network at a certain point in time, a specific mechanism must take place beforehand.

According to the prior art, before transmitting data units, the radiocommunication network signals a common channel identifier for each common upper level to a group of UEs via a common control channel. Then, whenever transmitting a data unit on a common upper level channel, the network adds the common channel identifier to the data unit. When a UE receives the transmitted data unit, it identifies the common upper level channel based on said added common channel identifier.

As an example, in the context of multicast services, it is known for the radiocommunication network to transmit an RRC message on an MCCH channel for example. This RRC message includes a list of service identifiers and a corresponding list of MTCH identifiers (one MTCH being generally used with respect to one respective multicast service).

Then, each MAC PDU (Protocol Data Unit) transmitted on an MCH channel by the radiocommunication network includes a MAC header. This MAC header includes an LCID (Logical Channel Identifier) field identifying a given MTCH among all MTCHs mapped to said MCH. To this end, the LCID field includes a corresponding MTCH identifier.

On reception of a MAC PDU, a UE can then retrieve the MTCH identifier from the incorporated LCID, and thus identify the relevant MTCH.

A disadvantage of this conventional art is that the radiocommunication network must signal the list of identifiers for all common upper level channels (e.g. MTCH) mapped to the same common lower level channel (e.g. MCH). This results in signaling overhead and radio resource waste.

An object of the present invention is to limit this disadvantage.

SUMMARY

The invention proposes a method of managing reception of data units transmitted from a radiocommunication network to a plurality of user equipments via a plurality of common upper level channels mapped to a same common lower level channel. The method comprises the following steps carried out by any user equipment of said plurality of user equipments:
  receiving a list of information relating respectively to each common upper level channel of said plurality of common upper level channels in a determined order, said information including no common upper level channel identifier;
  setting a common upper level channel identifier for each common upper level channel of said plurality of common upper level channels according to the received list of information.

Because the information in the received list do not include common upper level channel identifier, overhead signaling and radio resource waste are avoided. Still, common upper level channel identification by the user equipments is possible.

According to advantageous embodiments which can be combined in any possible way:
  the upper level channel identifier for each common upper level channel of said plurality of common upper level channels is set according to the determined order of said information in the received list of information; and/or
  the upper level channel identifier for each common upper level channel of said plurality of common upper level channels is set as a function of said information in the received list of information; and/or
  the method further comprises: receiving a data unit from the radiocommunication network via the common lower level channel, a common upper level channel identifier being associated with said data unit; and comparing the common upper level channel identifier associated with said data unit with at least one of the previously set common upper level channel identifiers, so as to identify the common upper level channel of said plurality of common upper level channels which carries said data unit; and/or
  the method further comprises forwarding at least part of said data unit to an upper layer according to the identified common upper level channel; and/or
  the plurality of common upper level channels comprises one common upper level control channel and at least one common upper level traffic channel; and/or
  it is set for the common upper level control channel one of the first and the last value among the set common upper level channel identifiers; and/or
  the plurality of common upper level channels comprises common upper level traffic channels only; and/or
  the common lower level channel is a common transport channel and the common upper level channels are common logical channels; and/or
  the common lower level channel and the common upper level channels are multicast channels; and/or
  the upper level channel identifier associated with said data unit is an LCID inserted into a MAC header of said data unit; and/or
  the information relating respectively to each common upper level channel of said plurality of common upper level channels comprises common upper level channel configuration information; and/or
  the information relating respectively to each common upper level channel of said plurality of common upper level channels comprises an identifier of a service to be rendered via a respective common upper level channel.

Another aspect of the invention relates to a user equipment arranged for implementing the above-mentioned method. The user equipment comprises:
  a reception unit for receiving a list of information relating respectively to each common upper level channel of said plurality of common upper level channels in a determined order, said information including no common upper level channel identifier;
  a setting unit for setting a common upper level channel identifier for each common upper level channel of said plurality of common upper level channels according to said list of information.

Another aspect of the invention relates to a system or a device in a radiocommunication network arranged for managing transmission of data units from a radiocommunication network to a plurality of user equipments via a plurality of common logical channels mapped to a same common transport channel. The system or device comprises:
  a transmission unit for transmitting a list of information relating respectively to each common upper level channel of said plurality of common upper level channels in a determined order, said information including no common upper level channel identifier;
  a transmission unit for transmitting a data unit via the common lower level channel, a common upper level channel identifier being associated with said data unit and being set in accordance with said list of information.

DESCRIPTION OF EXEMPLARY EMBODIMENTS

Hereinafter, a method of managing reception of data units transmitted from a radiocommunication network to a plurality of user equipments via a plurality of common upper level channels mapped to a same common lower level channel will be described according to non-limiting embodiments of the present invention.

In particular, the invention will be described hereinafter with respect to multicast channels. The common upper level channels considered here are MTCH or MCCH channels as defined previously, while the common lower level channel is an MCH. Many other scenarios are possible however under the scope of the present invention. For example, the common upper level channels could be MTCH or MCCH channels, while the common lower level channel would be a DL-SCH. Other types of channels are also possible, in addition to or in replacement of multicast channels.

Also, the upper level and lower level channels could relate to channels other than logical and transport channels. Any other levels or protocol layers could be used within the framework of the present invention.

Figure 8:
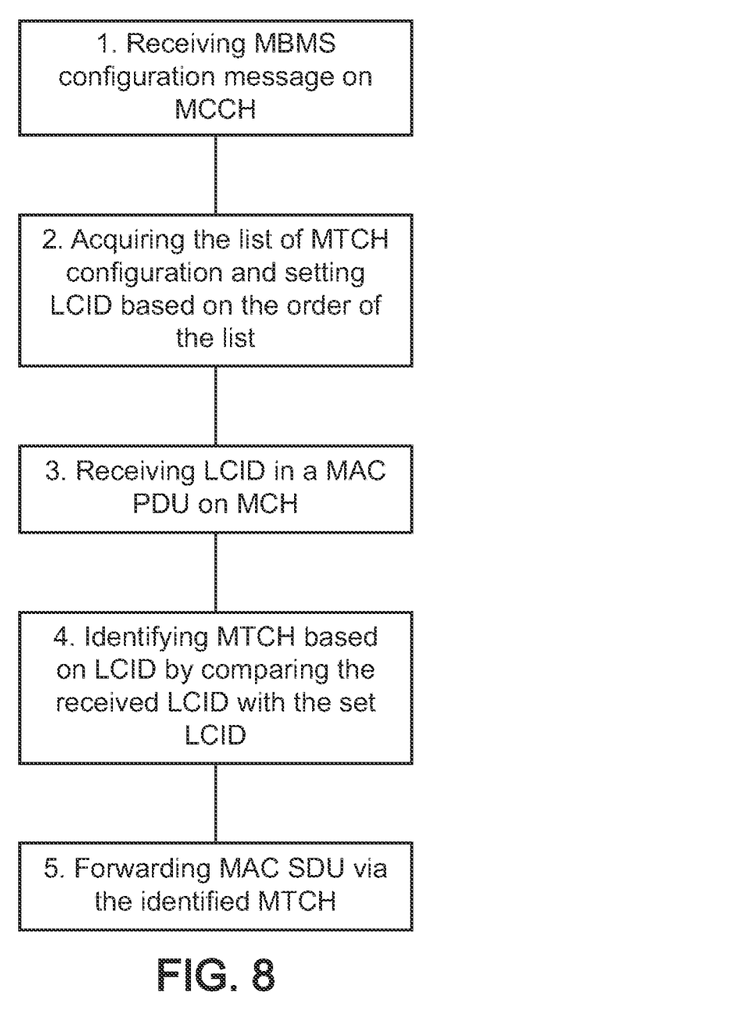
FIG. 8 is a block diagram showing steps carried out in an exemplary embodiment of the present invention, some of the steps being optional.

FIG. 8 shows a non-limiting embodiment of the invention making use of multicast channels (MBMS).

In step 1 of FIG. 8, a radiocommunication network sends a list of information relating respectively to each MTCH (and possibly MCCH) mapped to a same MCH. This list may be included in any type of message. It is advantageously sent through one or several base stations BSs of the radiocommunication network.

In the present example, the list of information is included in an MBMS configuration message and it is transmitted over an MCCH channel. All UEs listening to this common MCCH channel receive the message.

The MBMS configuration message is a known RRC message which includes a list of MTCH (and possibly MCCH) configuration. An important point however is that the list of information relating to MTCH does not include an identifier of the MTCH channels, in contrast with the conventional art described above.

It will be noted that other types of messages could be transmitted. Those messages could also include information relating to the MTCH (and possibly MCCH) channels other than configuration information. But in no case, the messages will include a common upper level channel identifier.

As a further example, which may be combined with the previous example, the information relating respectively to the MTCH (and possibly MCCH) channels may comprise an identifier of a service to be rendered via a respective MTCH channel.

Advantageously, the list of information relating to the MTCH (and possibly MCCH) channels is in a determined order. This order may be decided by the base station(s) transmitting the message, or by another device in the radiocommunication, such as a MBMS coordination function equipment or other.

Any one of the UEs listening to the MCCH channel on which the MBMS configuration message is transmitted can receive this message. A given UE among those UEs will be considered hereinafter.

In step 2 of FIG. 8, on receiving the MBMS configuration message, said given UE acquires the list of MTCH configurations from the received MBMS configuration message. It then sets a common upper level channel identifier, i.e. a MTCH (and possibly MCCH) identifier in the present example, for each MTCH (and possibly MCCH) channel mapped to the same MCH. This channel ID is according to the received list of information included in the MBMS configuration message.

In an advantageous embodiment, the UE sets the MTCH (and possibly MCCH) IDs according to the order of MTCH configurations in the received MBMS configuration message.

So while the MBMS configuration message does not include any MTCH ID, the UE can derive the MTCH (and possibly MCCH) IDs from the order of MTCH configurations in the received MBMS configuration message. An explicit signaling of the MTCH IDs is thus avoided, which reduces signaling overhead and radio resource waste. But the UE is capable of deriving MTCH IDs, and thus of identifying each MTCH channel. The MTCH IDs set by the UE may advantageously be in the same format as the LCID conventionally included in MAC header to designate a logical channel. Other formats can also be envisaged.

The following non-limiting examples show how the UE may implicitly set a logical channel ID for each MTCH (and possibly MCCH) according to the order of listed MTCH configuration.

Example 1

Example 1 relates to a situation where no MCCH is mapped to MCH. In other words, only MTCH channels are mapped to the MCH. In that scenario, the logical channel IDs may be allocated to MTCHs as follows:

In case of firstly listed MTCH configuration on the same MCH, Logical channel Id #0 is allocated to this MTCH.

In case of secondly listed MTCH configuration on the same MCH, Logical channel Id #1 is allocated to this MTCH.

In case of thirdly listed MTCH configuration on the same MCH, Logical channel Id #2 is allocated to this MTCH.

. . .

In case of seventhly listed MTCH configuration on the same MCH, Logical channel id #6 is allocated to this MTCH.

Example 2

Example 2 relates to a situation where an MCCH is mapped to MCH, in addition to MTCH channels. In that scenario, the logical channel IDs may be allocated as follows:

Logical channel Id #0 (that is the first value among the set Logical channel Ids) is allocated to the MCCH.

In case of firstly listed MTCH configuration on the same MCH, Logical channel Id #1 is allocated to this MTCH.

In case of secondly listed MTCH configuration on the same MCH, Logical channel Id #2 is allocated to this MTCH.

In case of thirdly listed MTCH configuration on the same MCH, Logical channel Id #3 is allocated to this MTCH.
...
In case of seventhly listed MTCH configuration on the same MCH, Logical channel id #7 is allocated to this MTCH.

Example 3

Example 3 also relates to a situation where an MCCH is mapped to MCH, in addition to MTCH channels. According to this example, logical channel IDs may be allocated as follows:
In case of firstly listed MTCH configuration on the same MCH, Logical channel Id #0 is allocated to this MTCH.
In case of secondly listed MTCH configuration on the same MCH, Logical channel Id #1 is allocated to this MTCH.
In case of thirdly listed MTCH configuration on the same MCH, Logical channel Id #2 is allocated to this MTCH.
...
In case of seventhly listed MTCH configuration on the same MCH, Logical channel id #6 is allocated to this MTCH.
...
The last Logical channel ID (that is the last value among the set Logical channel Ids) is allocated to this MCCH.

Other Logical channel ID settings are also possible within the framework of the present invention.

In step 3 of FIG. 8, the considered UE advantageously further receives a data unit from the radiocommunication network via the common lower level channel. In the present example, the UE receives a MAC PDU (Protocol Data Unit) on the MCH. This MAC PDU is based on the MBMS configuration message. A common upper level channel identifier is associated with said data unit. As an example, an LCID is inserted in the MAC header of the MAC PDU.

In step 4 of FIG. 8, the UE identifies the upper level channel (MTCH) by making use of the received LCID. To this end, it can compare the received LCID (or the channel Id included in it) with at least one of the previously set common upper level channel identifiers. The corresponding MTCH can thus be identified by the UE.

In step 5 of FIG. 8, the UE may advantageously forward at least part of the received data unit to an upper layer according to the identified common upper level channel. For example, the UE may remove the MAC header from the received MAC PDU to create a MAC SDU (Service Data Unit) and then forward the created MAC SDU to an upper layer in the UE via the identified MTCH.

Note that in the embodiment described with reference to FIG. 7, the common upper level channel identifiers are set according to the determined order of the configuration information list in the configuration message. However, the common upper level channel identifiers may alternatively be set as a function of configuration information (or even other listed information), rather than from the order of said information.

For example, the MTCH (and possibly MCCH) IDs may be set as a function of service identifiers listed in the MBMS configuration message.

For instance, let us consider that the MBMS configuration message (or another type of message) includes respective identifiers for multicast services, e.g. service #1, service #2, service #3, etc. Each multicast service is supposed to be rendered via one of the MTCH channels mapped to a same MCH. The UE may derive MTCH IDs from those service IDs. The function mapping MTCH IDs with service IDs may advantageously be stored beforehand in the UE.

Other examples may also be envisaged within the framework of the present invention, as will appear to one skilled in the art.

We claim:

1. A method of managing reception of data units transmitted from a radio communication network to a plurality of user equipments via a plurality of common upper level channels that are mapped to a same common lower level channel, the method preformed by a user equipment and comprising:
   receiving, by the user equipment, a list of information related to each of the plurality of common upper level channels in a determined order, the information not including any common upper level channel identifier;
   setting, by the user equipment, a common upper level channel identifier for each of the plurality of common upper level channels according to the received list of information;
   receiving, by the user equipment, a data unit from the radio communication network via the common lower level channel, wherein a common upper level channel identifier is associated with the data unit; and
   comparing, by the user equipment, the common upper level channel identifier associated with the data unit to at least one previously set common upper level channel identifier in order to identify the common upper level channel of the plurality of common upper level channels that carries the data unit.

2. The method as claimed in claim 1, wherein the common upper level channel identifier for each of the plurality of common upper level channels is set according to the determined order of the information in the received list of information.

3. The method as claimed in claim 1, wherein the common upper level channel identifier for each of the plurality of common upper level channels is set as a function of the information in the received list of information.

4. The method as claimed in claim 1, further comprising forwarding at least a portion of the data unit to an upper layer according to the identified common upper level channel.

5. The method as claimed in claim 1, wherein the plurality of common upper level channels comprises one common upper level control channel and at least one common upper level traffic channel.

6. The method as claimed in claim 5, wherein either a first value or a last value among previously set common upper level channel identifiers is set for the common upper level control channel.

7. The method as claimed in claim 1, wherein the plurality of common upper level channels comprises only common upper level traffic channels only.

8. The method as claimed in claim 1, wherein the common lower level channel is a common transport channel and the plurality of common upper level channels are common logical channels.

9. The method as claimed in claim 1, wherein the common lower level channel and the plurality of common upper level channels are multicast channels.

10. The method as claimed in claim 1, wherein the common upper level channel identifier associated with the data unit is a Logical Channel Identifier (LCID) inserted into a MAC header of the data unit.

11. The method as claimed in claim 1, wherein the information related to each of the plurality of common upper level channels comprises common upper level channel configuration information.

12. The method as claimed in claim 1, wherein the information related to each of the plurality of common upper level channels comprises an identifier of a service to be rendered via the corresponding common upper level channel.

13. A user equipment for managing reception of data units transmitted from a radio communication network to a plurality of user equipments via a plurality of common upper level channels that are mapped to a same common lower level channel, the user equipment comprising:
- a reception unit for:
  - receiving a list of information related to each of the plurality of common upper level channels in a determined order, the information not including any common upper level channel identifier; and
  - receiving a data unit from a radio communication network via the common lower level channel, wherein a common upper level channel identifier is associated with the data unit; and
- a setting unit for:
  - setting a common upper level channel identifier for each of the plurality of common upper level channels according to the received list of information; and
  - comparing the common upper level channel identifier associated with the data unit to at least one previously set common upper level channel identifier in order to identify the common upper level channel of the plurality of common upper level channels that carries the data unit.

14. The user equipment as claimed in claim 13, wherein the setting unit is further for setting the common upper level channel identifier for each of the plurality of common upper level channels according to the determined order of the information in the received list of information.

15. The method as claimed in claim 13, wherein the setting unit is further for setting the common upper level channel identifier for each of the plurality of common upper level channels as a function of the information in the received list of information.

16. The method as claimed in claim 13, wherein the setting unit is further for forwarding at least portion of the data unit to an upper layer according to the identified common upper level channel.

17. The method as claimed in claim 13, wherein the plurality of common upper level channels comprises one common upper level control channel and at least one common upper level traffic channel.

18. The method as claimed in claim 17, wherein either a first value or a last value among previously set common upper level channel identifiers is set for the common upper level control channel.

19. The method as claimed in claim 13, wherein the plurality of common upper level channels comprises only common upper level traffic channels.

20. The method as claimed in claim 13, wherein the common lower level channel is a common transport channel and the plurality of common upper level channels are common logical channels.

21. The method as claimed in claim 13, wherein the common lower level channel and the plurality of common upper level channels are multicast channels.

22. The method as claimed in claim 13, wherein the common upper level channel identifier associated with the data unit is a Logical Channel Identifier (LCID) inserted into a MAC header of the data unit.

23. The method as claimed in claim 13, wherein the information related to each of the plurality of common upper level channels comprises common upper level channel configuration information.

24. The method as claimed in claim 13, wherein the information related to each of the plurality of common upper level channels comprises an identifier of a service to be rendered via the corresponding common upper level channel.

* * * * *